(12) United States Patent
Lee

(10) Patent No.: US 12,371,592 B2
(45) Date of Patent: Jul. 29, 2025

(54) ECO-FRIENDLY ACRYLIC EMULSION OPP TAPE AND METHOD FOR MANUFACTURING SAME

(71) Applicant: In-Ho Lee, Jeollanam-do (KR)

(72) Inventor: In-Ho Lee, Jeollanam-do (KR)

( * ) Notice: Subject to any disclaimer, the term of this patent is extended or adjusted under 35 U.S.C. 154(b) by 294 days.

(21) Appl. No.: 18/013,038

(22) PCT Filed: Nov. 24, 2020

(86) PCT No.: PCT/KR2020/016719
§ 371 (c)(1),
(2) Date: Dec. 27, 2022

(87) PCT Pub. No.: WO2022/030689
PCT Pub. Date: Feb. 10, 2022

(65) Prior Publication Data
US 2023/0242792 A1    Aug. 3, 2023

(30) Foreign Application Priority Data
Aug. 4, 2020  (KR) .................. 10-2020-0097309

(51) Int. Cl.
| | | |
|---|---|---|
| C09J 7/38 | (2018.01) |
| B05D 3/04 | (2006.01) |
| B05D 3/06 | (2006.01) |
| C09J 7/24 | (2018.01) |
| C09J 133/08 | (2006.01) |

(52) U.S. Cl.
CPC ............ *C09J 7/385* (2018.01); *B05D 3/0413* (2013.01); *B05D 3/06* (2013.01); *C09J 7/243* (2018.01); *C09J 133/08* (2013.01)

(58) Field of Classification Search
CPC ..... C09J 7/385; C09J 7/24; C09J 7/243; C09J 133/08; C09J 133/04; C09J 2423/106; C09J 2433/00; B05D 3/0413; B05D 3/06; F26B 3/02; F26B 3/30; F26B 21/08; F26B 21/10
See application file for complete search history.

(56) References Cited

U.S. PATENT DOCUMENTS 10,184,722 B1 *  1/2019  Ingle ................. F26B 15/12

FOREIGN PATENT DOCUMENTS

| KR | 101380121 | 4/2014 | |
| WO | WO-2015111844 A1 * | 7/2015 | ............ C09J 7/0246 |

* cited by examiner

*Primary Examiner* — Alex B Efta
*Assistant Examiner* — Alexander S Wright
(74) *Attorney, Agent, or Firm* — IPLA P.A.

(57) ABSTRACT

An eco-friendly aqueous acrylic emulsion OPP tape and a method for manufacturing the same and, more particularly, to a method for manufacturing an OPP tape using an aqueous acrylic emulsion adhesive that adopts an optimized drying process to significantly enhance the production efficiency, and an OPP tape using an aqueous acrylic emulsion adhesive that is produced by the manufacturing method and has non-toxicity, durability secured by stability, and excellent adhesiveness and retention.

9 Claims, No Drawings

ECO-FRIENDLY ACRYLIC EMULSION OPP TAPE AND METHOD FOR MANUFACTURING SAME

BACKGROUND

The present invention relates to a packaging tape having an aqueous acrylic emulsion adhesive as an adhesive layer and a method for manufacturing a packaging tape that includes injecting an aqueous acrylic emulsion adhesive into a coating machine, applying a coating of the aqueous acrylic emulsion adhesive on a polypropylene film, and then drying the coated polypropylene film.

Solvent-type oil-based adhesives are generally used as an adhesive for packaging tapes. The solvent-type oil-based adhesives have excellent adhesiveness. However, there is a growing demand for another products with cleanliness while causing less pollution, because the solvent-type oil-based adhesives not only cause the risk of environmental contamination and fire, but also emit volatile organic compounds (VOCs) harmful to the human body during the manufacturing process and use. The use of solvent-type oil-based adhesives is currently regulated in advanced countries. Therefore, solvent-free water-based adhesives are being developed as an alternative to the solvent-type oil-based adhesives.

Currently, water-based acrylic adhesives are the most widely known solvent-free adhesives. The water-based acrylic adhesives have excellent adhesiveness, tackiness, weather resistance, and low-temperature properties. They also have a crosslinking function and take the form of an emulsion, resulting in high compatibility with other polymer emulsions and the increased solid content and securing excellent control and workability with a wide range of viscosity.

Korean Patent Registration No. 10-0342102, for example, discloses a recyclable adhesive tape for packaging and its manufacturing method, which includes: mixing a 10 to 15% aqueous PVA solution and a water-soluble silicon-based resin at a weight ratio of 1:1 and applying a single coating of the adhesive mixture on the back side of a kraft paper to a dry film thickness of 3 to 5 μm once to form a release layer capable of alkali repulping; and mixing a pure acrylic polymer and a polypropylene glycol alkyl phenyl ether-based plasticizer to prepare an adhesive with a solid content maintained in the range of 10 to 25% and applying a coating of the adhesive to the front side of the kraft paper to a dry film thickness of 30 to 40 μm, where each process is performed under given drying conditions with a drying temperature of 95 to 105° C. and a drying speed of 60 to 100/sec.

Besides, Korean Patent Publication No. 10-4004-0030189 disclose an acrylic or rubber-based water-dispersible adhesive composition and an adhesive product with an adhesive layer formed from the water-dispersible adhesive composition, where the water-dispersible adhesive composition includes at least one hydrophilic polymer selected from the group consisting of polyalkylene glycol, polyvinylpyrrolidone, poly(vinylalcohol), and poly((meth)acrylate) in an amount of 0.5 to 15 parts by weight with respect to 100 parts by weight of the solid of the acrylic or rubber-based water-dispersible adhesive composition.

Japanese Patent Registration No. 2011-74219 describes a water-dispersible acrylic adhesive composition containing an acrylic copolymer forming acrylic copolymer emulsion particles, where the acrylic copolymer includes a high-molecular-weight acrylic copolymer having a weight average molecular weight of 500,000 to 1,200,000 and a low-molecular-weight acrylic copolymer having a weight average molecular weight of 5,000 to 250,000. The high-molecular-weight acrylic copolymer contains 2-ethylhexylacrylate, methacrylate having an alkyl group with 4 to 8 carbon atoms, acrylic acid, methacrylic acid, and a nitrogen-containing vinyl monomer as a monomer component. The content weight ratio of the high-molecular-weight acrylic copolymer to the low-molecular-weight acrylic copolymer is 100:3 to 100:50.

In addition, U.S. Pat. No. 6,706,392 B2 discloses a solvent-free adhesive tape for packaging that has a polyolefin-based film and an adhesive layer, which is applied at 10 to 45 g/m$^2$ on the film and prepared with a second mixture containing an adhesive acrylic dispersant, to acquire improved adhesive properties and increased water insensitivity by the virtue of the fact that the special, acrylic dispersant includes first and second acrylic dispersants at a weight ratio of 99:1 to 99:10, where the second acrylic dispersant is comprised of 65 to 84 wt. % of acrylate, 15 to 34 wt. % of methacrylate, 0.5 to 2 wt. % of acrylic acid, and 0.1 to 1 wt. % of propylene amine.

However, those conventional patent documents have no mention of the optimization of the drying process for aqueous acrylic adhesives.

Particularly, productivity and work efficiency are greatly dependent upon the drying process after applying a coating of the adhesive composition on the film substrate. It is thus necessary to adopt a drying process optimized for the aqueous acrylic adhesive composition.

In an effort to establish the optimization of a drying process for tapes using an aqueous acrylic emulsion adhesive, the inventors of the present invention have found it out that optimizing the temperature and humidity conditions in each chamber in the drying process using a plurality of chambers sequentially arranged to move the adhesive-coated film coated with the aqueous acrylic emulsion adhesive through resulted in remarkably enhancing the production rate of the tapes and the production efficiency, including reduced defect rates, thereby completing the present invention.

SUMMARY OF THE DISCLOSURE

It is an object of the present invention to provide a method for manufacturing an OPP tape using an aqueous acrylic emulsion adhesive that has production efficiency enhanced by adopting an optimized drying process in the manufacture of the OPP tape using an aqueous acrylic emulsion adhesive.

It is another object of the present invention to provide an OPP tape using an aqueous acrylic emulsion adhesive that is produced by the manufacturing method of the present invention and has non-toxicity, durability secured by stability, and excellent adhesiveness.

In order to achieve the objects, the present invention provides a method for manufacturing an OPP tape using an aqueous acrylic emulsion adhesive that includes: (i) mixing 2-ethylhexylacrylate, butylacrylate, acrylic acid, methacrylic acid, vinyl acetate, ethylene glycol, an emulsifier, and water to prepare an aqueous acrylic emulsion adhesive; (ii) applying the aqueous acrylic emulsion adhesive on an oriented polypropylene (OPP) film to prepare an adhesive-coated polypropylene film; (iii) drying the adhesive-coated polypropylene film with a drying device; and (iv) conducting an aging process by stabilizing the adhesive-coated polypropylene film dried in the drying step. The drying device of the drying step (iii) may include: 10 to 15 chambers connected in series, each chamber having a defined inner space portion, a tape inlet, and a tape outlet; a guide member being provided in each chamber and configured with a roller supported by a bracket in the chamber to guide the adhesive-coated polypropylene film from the tape inlet to the outlet a heating means being provided in each chamber to heat the adhesive-coated polypropylene film guided by the guide member; a control means being provided in each chamber to control at least one of the heat, infrared ray, wind force, and wind pressure in the chamber; and a temperature sensor provided in each chamber to sense the temperature in the chamber and a humidity sensor provided in each chamber to sense the humidity in the chamber.

The present invention also provides a drying device for OPP tapes using an aqueous acrylic emulsion adhesive that includes: (a) 10 to 15 chambers connected in series, each chamber having a defined inner space portion, a tape inlet, and a tape outlet; (b) a guide member being provided in each chamber and configured with a roller supported by a bracket in the chamber to guide the adhesive-coated polypropylene film from the tape inlet to the outlet; (c) a heating means being provided in each chamber to heat the adhesive-coated polypropylene film guided by the guide member; (d) a control means being provided in each chamber to control at least one of the heat, infrared ray, wind force, and wind pressure in the chamber; and (e) a temperature sensor provided in each chamber to sense the temperature in the chamber and a humidity sensor provided in each chamber to sense the humidity in the chamber.

The present invention also provides an OPP tape using an aqueous acrylic emulsion adhesive that is prepared by the manufacturing method of the present invention.

The present invention uses a drying device consisting of at least 10 chambers to dry the polypropylene film coated with the aqueous acrylic emulsion adhesive under the optimized temperature and humidity conditions in each chamber, resulting in a significant increase in the production rate of the packaging tape and a great reduction of the defect rate.

Further, the present invention has a temperature sensor and a humidity sensor equipped in each chamber of the drying device, and a data processor used to automatically control the heat, infrared ray, wind force, and wind pressure of each chamber according to the information acquired from the temperature sensor and the humidity sensor, thereby remarkably increasing the productivity of the packaging tape.

Furthermore, the present invention can significantly improve the production rate and reduce the defect rate through optimization of the production process to greatly reduce the existing price of the tape products, in preparation for the dropping productivity of the conventional production process and the consequent rise of the price of the products.

DETAILED DESCRIPTION OF THE INVENTION

Hereinafter, the present invention will be described in further detail.

Unless otherwise defined, the terms used herein, including technical and scientific terms, have the same meanings as commonly understood to those skilled in the art to which the invention belongs. The description of the technical configuration and function identical to those of the related art will be omitted in order to avoid redundancy.

The present invention provides a method for manufacturing an OPP tape using an aqueous acrylic emulsion adhesive that includes: (i) mixing 2-ethylhexylacrylate, butylacrylate, acrylic acid, methacrylic acid, vinyl acetate, ethylene glycol, an emulsifier, and water to prepare an aqueous acrylic emulsion adhesive; (ii) applying the aqueous acrylic emulsion adhesive on an oriented polypropylene (OPP) film to prepare an adhesive-coated polypropylene film; (iii) drying the adhesive-coated polypropylene film with a drying device; and (iv) conducting an aging process by stabilizing the adhesive-coated polypropylene film dried in the drying step. The drying device of the drying step (iii) may include: 10 to 15 chambers connected in series, each chamber having a defined inner space portion, a tape inlet, and a tape outlet; a guide member being provided in each chamber and configured with a roller supported by a bracket in the chamber to guide the adhesive-coated polypropylene film from the tape inlet to the outlet; a heating means being provided in each chamber to heat the adhesive-coated polypropylene film guided by the guide member; a control means being provided in each chamber to control at least one of the heat, infrared ray, wind force, and wind pressure in the chamber; and a temperature sensor provided in each chamber to sense the temperature in the chamber and a humidity sensor provided in each chamber to sense the humidity in the chamber.

In the manufacturing method, the aqueous acrylic emulsion adhesive of the step (i) may be prepared by a method that includes: (S10) preparing an acrylic monomer mixture; (S20) preparing an emulsion; (S30) adding acrylic monomers dropwise to prepare a polymer product; and (S40) conducting an emulsification reaction and an ageing process to obtain an adhesive composition.

The step S10 of preparing an acrylic monomer mixture is mixing 2-ethylhexylacrylate, butylacrylate, acrylic acid, and methacrylic acid in a first mixing container to prepare an acrylic monomer mixture.

Preferably, the acrylic monomer mixture is a mixture composed of 64 to 71 wt. % of 2-ethylhexylacrylate, 24 to 31 wt. % of butylacrylate, 2.5 to 3.5 wt. % of acrylic acid, and 2.5 to 3.5 wt. % of methacrylic acid.

In the acrylic monomer mixture, 2-ethylhexylacrylate and butylacrylate are used in an amount of 6.4 to 71 wt. % and 24 to 31 wt. %, respectively, with respect to the total weight of the acrylic monomer mixture. When the total sum of amounts of 2-ethylhexylacrylate and butylacrylate is 95 wt. % or less, the glass transition temperature of the aqueous adhesive is raised to cause a deterioration of tackiness and adhesiveness. When the total sum of amounts of 2-ethylhexylacrylate and butylacrylate is greater than 95 wt. %, the high-temperature adhesion may deteriorate due to the low glass transition temperature of the aqueous adhesive.

The step of S20 of preparing an emulsion is adding 60 to 70 wt. % of vinyl acetate and 30 to 40 wt. % of ethylene glycol into a second mixing container to prepare an emulsion. The emulsion thus obtained is used to enhance the initial adhesion and high-temperature adhesion of the aqueous acrylic adhesive. The used amount of the emulsion is in the range of 10 to 25 wt. % with respect to 70 to 90 wt. % of the acrylic monomer mixture. The amount of the emulsion 10 wt. % or less is too little to improve the initial adhesion and high-temperature adhesion, whereas the amount of the emulsion greater than 25 wt. % may cause a phase separation in the aqueous adhesive and hence a deterioration of the adhesiveness.

The step S30 of adding acrylic monomers dropwise to prepare a polymer product is placing 10 to 25 wt. % of the emulsion with respect to 70 to 90 wt. % of the acrylic monomer mixture in a separate reaction container and adding the acrylic monomer mixture of the step S10 dropwise into the reaction container over 2 to 4 hours at a raised temperature maintained in the range of 68 to 72° C. to prepare an acrylic polymer product through polymerization.

The step S40 of conducting an emulsification reaction and an ageing process to obtain an adhesive composition is adding 40 to 45 wt. % of water and 0.1 to 0.5 wt. % of an emulsifier with respect to 59 to 45 wt. % of the acrylic polymer product into the reaction container, conducting an aging process at 72 to 77° C. for 2.5 to 3.5 hours and then cooling down to the room temperature to prepare an adhesive composition.

Preferably, the emulsifier is t-dodecyl mercaptan, including an anionic emulsifier, a nonionic emulsifier, or a Zwitterionic emulsifier, which may be used alone or in combination. The emulsifier may be used in an amount of 0.2 to 0.3 wt. % with respect to 54 to 45 wt. % of the acrylic polymer product. The amount of the emulsifier 0.2 wt. % or less is too little to sufficiently emulsify the aqueous acrylic adhesive composition, whereas the amount of the emulsifier greater than 0.3 wt. % may result in deterioration of the weather resistance of the acrylic adhesive composition.

The water serves as a dispersing agent to emulsify the acrylic polymer product into an aqueous emulsion and is used in an amount of 40 to 45 wt. % with respect to 54 to 45 wt. % of the acrylic polymer product. The amount of the water less than 40 wt. % is too little to sufficiently emulsify the aqueous acrylic adhesive composition, whereas the amount of the water greater than 45 wt. % may reduce the concentration and viscosity of the aqueous acrylic adhesive composition and hence deteriorate the adhesive performance.

In the manufacturing method, the step (ii) of coating a film substrate with the adhesive is applying a single coating of the aqueous acrylic emulsion adhesive on an oriented polypropylene (OPP) film used as a film substrate to a coating thickness of 1 to 5 μm.

The fabric of the OPP film wound around the holder in a roll form moves continuously while being tensioned and unwound by tensile guide rollers interlocked with the top and bottom of the OPP film. During the moving process, the aqueous acrylic adhesive composition flows down from the coating machine on one surface of the OPP film by the adhesive coating device and is evenly spread by a compression roller. The coating thickness may be adjusted according to the moving speed of the OPP film, the film width, and the feeding amount of the aqueous acrylic adhesive composition.

The OPP tape may be a single-sided adhesive tape when the aqueous acrylic adhesive composition is applied to form an adhesive layer only on one side of the film. Otherwise, it may be a double-sided adhesive tape for the purpose of bonding two members.

In the manufacturing method, the step (iii) of conducting a drying with a drying device is drying the OPP film coated with the aqueous acrylic adhesive composition while the OPP film is continuously moved through a stepwise chamber-by-chamber drying section consisting of a plurality of chambers. The drying device may include: 10 to 15 chambers connected in series, each chamber having a defined inner space portion, a tape inlet and a tape outlet; a guide member being provided in each chamber and configured with a roller supported by a bracket in the chamber to guide the adhesive-coated polypropylene film from the tape inlet to the outlet; a heating means being provided in each chamber to heat the adhesive-coated polypropylene film guided by the guide member; a control means being provided in each chamber to control at least one of the heat, infrared ray, wind force, and wind pressure in the chamber; and a temperature sensor provided in each chamber to sense the temperature in the chamber and a humidity sensor provided in each chamber to sense the humidity in the chamber.

The guide member of the drying device includes a roller supported by a bracket in the chamber, thereby reducing the resistance incurred as a consequence of the transfer of the coated OPP film.

The drying device may further include a data processor for automatically adjusting at least one of the heat, infrared ray, wind force, and wind pressure in each chamber to a set value according to the information detected by the temperature sensor and the humidity sensor of the chamber.

Each chamber of the drying device is capable of conducting hot air drying or infrared drying. The drying device may be entirely configured with chambers sequentially arranged in the order of hot air drying, infrared drying and hot air drying.

Preferably, the drying device may sequentially perform a hot air drying in the front chambers to quickly discharge vapors from the coating surface of the initial OPP film for the sake of smoothly discharging vaporizing droplets, such as water vapor, and optimizing the heating and drying temperature according to the drying progress; an infrared drying in the middle chambers to dry and heat deep into the coating layer; and a hot air drying in the rear chambers to smoothly discharge vaporizing droplets evaporated by heating deep into the OPP coating through the infrared drying process.

In the drying device, the OPP film coated with the adhesive composition is continuously moved through a plurality of chambers preferably at a moving speed of 60 to 90 m/min, and more preferably at 70 to 90 m/min. The moving speed less than 70 m/min results in deterioration of productivity, whereas the moving speed greater than 90 m/min may force the OPP film to be stretched due to excessive tensile force.

In the drying device, the moving speed of the coated OPP film can be increased by the plurality of chambers and the temperature and humidity conditions in each chamber, significantly faster than that of the coated OPP film for drying in the manufacturing process of the conventional aqueous acrylic adhesive OPP tape that is merely 50 to 65 m/min, thereby greatly increasing the production rate of the products.

Preferably, the temperature of each chamber in the drying device is 60 to 70° C. for the first chamber, 70 to 80° C. for the second chamber, 80 to 90° C. for the third chamber, 90 to 100° C. for the fourth chamber, 100 to 105° C. for the fifth chamber, 105 to 110° C. for the sixth chamber, 90 to 100° C. for the seventh chamber, 80 to 90° C. for the eighth chamber, 70 to 80° C. for the ninth chamber, and 60 to 70° C. for the tenth chamber. Optionally, when the chamber is any one of 11 to 15 chambers, the temperature is 55 to 65° C. for the eleventh and twelfth chambers and 45 to 55° C. for the thirteenth, fourteenth, and fifteenth chambers.

More preferably, the temperature of each chamber in the drying device is 65 to 70° C. for the first chamber, 75 to 80° C. for the second chamber, 85 to 90° C. for the third chamber, 95 to 100° C. for the fourth chamber, 100 to 105° C. for the fifth chamber, 105 to 110° C. for the sixth chamber, 95 to 100° C. for the seventh chamber, 85 to 90° C. for the eighth chamber, 75 to 80° C. for the ninth chamber, and 65 to 70° C. for the tenth chamber. Optionally, the temperature is 60 to 65° C. for the eleventh chamber, 60 to 65° C. for the twelfth chamber, 50 to 55° C. for the thirteenth chamber, 45 to 50° C. for the fourteenth chamber, and 45 to 50° C. for the fifteenth chamber.

In the manufacturing method, the step (iv) of conducting a stabilization-aging process is an aging step of stabilizing the dried OPP film from the drying step. The OPP film that comes out of the dryer is wound by a winding machine and transferred to an aging room for stabilization for 3 to 5 days. In the stabilization-aging step, evaporation residues are removed, and an emulsion polymerization occurs to increase the adhesiveness.

The manufacturing method may further include a step of packaging the aged OPP film in a predetermined width and length according to the purpose of use, after the stabilization-aging step (iv).

The present invention also provides a drying device for OPP tapes using an aqueous acrylic emulsion adhesive that includes: 10 to 15 chambers connected in series, each chamber having a defined inner space portion, a tape inlet and a tape outlet; a guide member being provided in each chamber and configured with a roller supported by a bracket in the chamber to guide the adhesive-coated polypropylene film from the tape inlet to the outlet; a heating means being provided in each chamber to heat the adhesive-coated polypropylene film guided by the guide member; a control means being provided in each chamber to control at least one of the heat, infrared ray, wind force, and wind pressure in the chamber; and a temperature sensor provided in each chamber to sense the temperature in the chamber and a humidity sensor provided in each chamber to sense the humidity in the chamber.

The drying device may further include a data processor for automatically adjusting at least one of the heat, infrared ray, wind force, and wind pressure in each chamber to a set value according to information detected by the temperature sensor and the humidity sensor of the chamber.

Each chamber of the drying device is capable of conducting hot air drying or infrared drying. The drying device may be entirely configured with chambers sequentially arranged in the order of hot air drying, infrared drying and hot air drying.

Preferably, the temperature of each chamber of the drying device is 60 to 70° C. for the first chamber, 70 to 80° C. for the second chamber, 80 to 90° C. for the third chamber, 90 to 100° C. for the fourth chamber, 100 to 105° C. for the fifth chamber, 105 to 110° C. for the sixth chamber, 90 to 100° C. for the seventh chamber, 80 to 90° C. for the eighth chamber, 70 to 80° C. for the ninth chamber, and 60 to 70° C. for the tenth chamber. Optionally, when the chamber is any one of 11 to 15 chambers, the temperature is 55 to 65° C. for the eleventh and twelfth chambers and 45 to 55° C. for the thirteenth, fourteenth and fifteenth chambers.

The present invention also provides an OPP tape using an aqueous acrylic emulsion adhesive that is manufactured by the method according to the present invention.

Hereinafter, a detailed description of the present invention will be given to help the understanding of the present invention with reference to the following examples, which are merely illustrative of the contents of the present invention and not intended to limit the scope of the present invention. The examples of the present invention are provided for more complete explanation of the present invention to those skilled in the art.

<Example 1> Preparation 1 of OPP Tape Using Aqueous Acrylic Emulsion Adhesive According to Present Invention 70 wt. % of 2-ethylhexylacrylate, 24 wt. % of butylacrylate, 3 wt. % of acrylic acid, and 3 wt. % of methacrylate were mixed in a first mixing container to prepare an acrylic monomer mixture. Separately, 70 wt. % of vinyl acrylate and 30 wt. % of ethylene glycol were mixed in a second mixing container to prepare an emulsion. 20 wt. % of the emulsion was put in a separate reaction container. Then, 80 wt. % of the acrylic monomer mixture was added dropwise into the reaction container under temperature conditions maintained at 68 to 72° C. to incur a polymerization reaction for 2 hours to obtain an acrylic polymer product. In the reaction container, 55 wt. % of the acrylic polymer product, 44.7 wt. % of water and 0.3 wt. % of an emulsifier (t-dodecyl mercaptan) were mixed, aged at 73 to 75° C. for 3 hours, and cooled down to the room temperature to prepare an adhesive composition.

The fabric of the OPP film wound around the holder in a roll form was moved continuously while being tensioned and unwound by tensile guide rollers interlocked with the top and bottom of the OPP film. During the moving process, the aqueous acrylic adhesive composition flew down from the coating machine on one surface of the OPP film by an adhesive coating device and was evenly spread by a compression roller. Here, the adhesive composition was applied once to a coating thickness of 2 to 3 μm.

A drying device was manufactured in-house and used to dry the adhesive-coated OPP film. The drying device was configured to include 10 chambers connected in series, and each chamber was equipped with a guide member, a heating means, a control means to control the temperature, wind force and wind pressure of the chamber, a temperature sensor, and a humidity sensor.

As for the individual chambers of the drying device, the first to fourth chambers were set for hot air drying, the fifth, sixth and seventh chambers for infrared drying, and the eighth, ninth and tenth chambers for hot air drying. The drying temperature of each chamber was set to 68±2° C. for the first chamber, 75±2° C. for the second chamber, 83±2° C. for the third chamber, 97±2° C. for the fourth chamber, 103±2° C. for the fifth chamber, 108±2° C. for the sixth chamber, 98±2° C. for the seventh chamber, 88±2° C. for the eighth chamber, 77±2° C. for the ninth chamber, and 67±2° C. for the tenth chamber.

The dried OPP film coated with the aqueous acrylic adhesive was wound by a winding machine and stabilized at the room temperature for 3 days in an aging room.

<Example 2> Preparation 2 of OPP Tape Using Aqueous Acrylic Emulsion Adhesive According to Present Invention The procedures were performed to prepare an OPP film in the same manner as described in Example 1, excepting that a drying device designed to have 12 chambers connected in series was used to dry the OPP film under temperature conditions set for each chamber as follows.

Specifically, the drying temperature of each chamber was set to 68±2° C. for the first chamber, 78±2° C. for the second chamber, 88±2° C. for the third chamber, 98±2° C. for the fourth chamber, 103±2° C. for the fifth chamber, 108±2° C. for the sixth chamber, 98±2° C. for the seventh chamber, 88±2° C. for the eighth chamber, 78±2° C. for the ninth chamber, 68±2° C. for the tenth chamber, 60±2° C. for the eleventh chamber, and 57±2° C. for the twelfth chamber.

<Comparative Example 1> Preparation of OPP Tape Using Hot Air Dryer of Second Chamber and Infrared Dryer of First Chamber The procedures were performed to prepare an OPP tape in the same manner as described in Example 1, excepting that the drying device was replaced by a drying device designed as follows.

Specifically, the drying device was configured with three chambers, including the first chamber designed to perform a hot air drying at 90 to 100° C., the second chamber to perform an infrared drying at 110 to 120° C., and the third chamber to perform a hot air drying at 70 to 80° C.

<Comparative Example 2> Preparation of OPP Tape Using Dryer with 6 Chambers

The procedures were performed to prepare an OPP tape in the same manner as described in Example 1, excepting that the drying device was replaced by a drying device designed as follows.

Specifically, the drying device was configured with six chambers, and the drying temperature of each chamber was set to 80±2° C. for the first chamber (hot air drying), 90±2° C. for the second chamber (hot air drying), 105±2° C. for the third chamber (infrared drying), 110±2° C. for the fourth chamber (infrared drying), 90±2° C. for the fifth chamber (hot air drying), and 75±2° C. for the sixth chamber (hot air drying).

<Comparative Example 3> Preparation of OPP Tape Using Dryer with 8 Chambers

The procedures were performed to prepare an OPP tape in the same manner as described in Example 1, excepting that the drying device was replaced by a drying device designed as follows.

Specifically, the drying device was configured with eight chambers, and the drying temperature of each chamber was set to 74±2° C. for the first chamber (hot air drying), 80±2° C. for the second chamber (hot air drying), 88±2° C. for the third chamber (infrared drying), 101±2° C. for the fourth chamber (infrared drying), 104±2° C. for the fifth chamber (hot air drying), 100±2° C. for the sixth chamber (hot air drying), 80±2° C. for the seventh chamber (hot air drying), and 55±2° C. for the eighth chamber (hot air drying).

<Comparative Example 4> Preparation of OPP Tape Using Dryer Under Different Temperature Conditions of Front Chambers The procedures were performed to prepare an OPP film in the same manner as described in Example 1, excepting that the drying temperature of each chamber was set as follows.

The drying temperature of each chamber was set to 85±2° C. for the first chamber, 88±2° C. for the second chamber, 99±2° C. for the third chamber, 110±2° C. for the fourth chamber, 120±2° C. for the fifth chamber, 108±2° C. for the sixth chamber, 98±2° C. for the seventh chamber, 88±2° C. for the eighth chamber, 77±2° C. for the ninth chamber, and 67±2° C. for the tenth chamber.

<Comparative Example 5> Preparation of OPP Tape Using Dryer Under Different Temperature Conditions of Rear Chambers The procedures were performed to prepare an OPP film in the same manner as described in Example 1, excepting that the drying temperature of each chamber was set as follows.

The drying temperature of each chamber was set to 70±2° C. for the first chamber, 75±2° C. for the second chamber, 83±2° C. for the third chamber, 97±2° C. for the fourth chamber, 108±2° C. for the fifth chamber, 115±2° C. for the sixth chamber, 120±2° C. for the seventh chamber, 104±2° C. for the eighth chamber, 90±2° C. for the ninth chamber, and 78±2° C. for the tenth chamber.

<Experimental Example 1> Properties of OPP Tape

The testing was performed in a test environment with a temperature of 18 to 28° C. and a humidity of 40 to 60% according to the KS T-1046 testing method. The results were given as follows.

TABLE 1

| Div. | Example | | Comparative Example | | | | |
|---|---|---|---|---|---|---|---|
| | 1 | 2 | 1 | 2 | 3 | 4 | 5 |
| Appearance | Normal | Normal | Major defect | Normal | Normal | Minor defect | Minor defect |
| Adhesiveness (normal state) (N/cm) | 7.9 | 8.5 | 4.4 | 5.3 | 5.9 | 6.1 | 5.8 |
| Adhesiveness (after storage test) (N/cm) | 6.8 | 7.2 | 2.7 | 3.9 | 4.0 | 4.3 | 3.9 |
| Retention (normal state) (off-center distance: mm) | 0.8 | 0.7 | 2.4 | 1.5 | 1.5 | 1.2 | 1.8 |
| Retention (after storage test) (off-center distance: mm) | 1.4 | 1.2 | 2.9 | 2.2 | 2.0 | 1.8 | 2.4 |

<Experimental Example 2> Production Efficiency of OPP Tape

As for the moving speed of the drying device, the maximum speed was determined at a level where adhesiveness and retention were maintained with no defects. At the continuous moving speeds of 50 m/min, 60 m/min, 70 m/min, and 80 m/min in the drying zone, the degree of defects was classified into minor defect (with slightly deteriorated physical properties) and major defect (with significantly deteriorated physical properties).

TABLE 2

| Div. | Appearance | Adhesiveness (normal state) | Retention (Normal state) |
|---|---|---|---|
| Example 1 | No defect up to 80 m/min | No defect up to 80 m/min | No defect up to 80 m/min |
| Example 2 | No defect up to 80 m/min | No defect up to 80 m/min | No defect up to 80 m/min |
| Comparative Example 1 | Major defect at 50 m/min | Major defect at 60 m/min | Major defect at 60 m/min |
| Comparative Example 2 | Major defect at 70 m/min | Major defect at 70 m/min | Major defect at 60 m/min |
| Comparative Example 3 | Major defect at 70 m/min | Major defect at 70 m/min | Major defect at 70 m/min |
| Comparative Example 4 | Major defect at 70 m/min | Major defect at 70 m/min | Major defect at 70 m/min |
| Comparative Example 5 | Major defect at 70 m/min | Major defect at 70 m/min | Major defect at 70 m/min |

What is claimed is:

1. A method for manufacturing an OPP tape using an aqueous acrylic emulsion adhesive, the method comprising:
 (i) mixing 2-ethylhexylacrylate, butylacrylate, acrylic acid, methacrylic acid, vinyl acetate, ethylene glycol, an emulsifier, and water to prepare an aqueous acrylic emulsion adhesive;
 (ii) applying the aqueous acrylic emulsion adhesive on an oriented polypropylene (OPP) film to prepare an adhesive-coated polypropylene film;
 (iii) drying the adhesive-coated polypropylene film with a drying device; and
 (iv) conducting an aging process by stabilization of the adhesive-coated polypropylene film dried in the drying step,
 wherein the drying device of the drying step (iii) comprises:
  (a) 10 to 15 chambers connected in series, each chamber having a defined inner space portion, a tape inlet, and a tape outlet;
  (b) a guide member being provided in each chamber and configured with a roller supported by a bracket in the chamber to guide the adhesive-coated polypropylene film from the tape inlet to the outlet;
  (c) a heating means being provided in each chamber to heat the adhesive-coated polypropylene film guided by the guide member;
  (d) a control means being provided in each chamber to control at least one of heat, infrared ray, wind force, and wind pressure in the chamber; and
  (e) a temperature sensor provided in each chamber to sense the temperature in the chamber and a humidity sensor provided in each chamber to sense the humidity in the chamber, wherein the adhesive-coated polypropylene film is continuously moved through the chambers at a moving speed of 70 to 90 m/min.

2. The method according to claim 1, wherein the drying device further comprises a data processor for automatically adjusting at least one of the heat, infrared ray, wind force, and wind pressure in each chamber to a set value according to information detected by the temperature sensor and the humidity sensor of the chamber.

3. The method according to claim 1, wherein each chamber of the drying device is capable of conducting hot air drying or infrared drying, wherein the drying device is entirely configured with chambers sequentially arranged in the order of hot air drying, infrared drying and hot air drying.

4. The method according to claim 1, wherein the temperature of each chamber of the drying device is 60 to 70° C. for the first chamber, 70 to 80° C. for the second chamber, 80 to 90° C. for the third chamber, 90 to 100° C. for the fourth chamber, 100 to 105° C. for the fifth chamber, 105 to 110° C. for the sixth chamber, 90 to 100° C. for the seventh chamber, 80 to 90° C. for the eighth chamber, 70 to 80° C. for the ninth chamber, and 60 to 70° C. for the tenth chamber,
 wherein optionally, when the chamber is any one of 11 to 15 chambers, the temperature is 55 to 65° C. for the eleventh and twelfth chambers and 45 to 55° C. for the thirteenth, fourteenth and fifteenth chambers.

5. An OPP tape using an aqueous acrylic emulsion adhesive manufactured by the method according to claim 1.

6. The method according to claim 1, wherein the adhesive-coated polypropylene film is continuously moved through the chambers at a moving speed that is from a moving speed greater than 70 m/min to a moving speed of 90 m/min.

7. The method according to claim 1, wherein the adhesive-coated polypropylene film is continuously moved through the chambers at a moving speed of 80 m/min.

8. The method according to claim 3, wherein the drying step (iii) further comprises:
 (g) setting the first to fourth chambers for hot air drying, setting the fifth, sixth and seventh chambers for infrared drying, and setting the eighth, ninth and tenth chambers for hot air drying.

9. The method according to claim 8, wherein the drying temperature was set to 68±2° C. for the first chamber, 78±2° C. for the second chamber, 88±2° C. for the third chamber, 98±2° C. for the fourth chamber, 103±2° C. for the fifth chamber, 108±2° C. for the sixth chamber, 98±2° C. for the seventh chamber, 88±2° C. for the eighth chamber, 78±2° C. for the ninth chamber, 68±2° C. for the tenth chamber, 60±2° C. for the eleventh chamber, and 57±2° C. for the twelfth chamber.

* * * * *